United States Patent
Sato

(10) Patent No.: US 10,024,437 B2
(45) Date of Patent: Jul. 17, 2018

(54) ASSEMBLY METHOD OF MAGNETIC FLUID SEAL AND MAGNETIC FLUID SEAL

(71) Applicant: EagleBurgmann Japan Co., Ltd., Tokyo (JP)

(72) Inventor: Kazuhiko Sato, Tokyo (JP)

(73) Assignee: EagleBurgmann Japan Co., Ltd., Tokyo (JP)

( * ) Notice: Subject to any disclaimer, the term of this patent is extended or adjusted under 35 U.S.C. 154(b) by 0 days.

(21) Appl. No.: 15/308,553

(22) PCT Filed: May 1, 2015

(86) PCT No.: PCT/JP2015/063141
§ 371 (c)(1),
(2) Date: Nov. 2, 2016

(87) PCT Pub. No.: WO2015/174306
PCT Pub. Date: Nov. 19, 2015

(65) Prior Publication Data
US 2017/0051833 A1    Feb. 23, 2017

(30) Foreign Application Priority Data

May 13, 2014 (JP) .................................. 2014-099713

(51) Int. Cl.
*F16J 15/43* (2006.01)
*F16C 33/78* (2006.01)
(Continued)

(52) U.S. Cl.
CPC .............. *F16J 15/43* (2013.01); *F16C 33/762* (2013.01); *F16C 33/78* (2013.01); *F16C 35/07* (2013.01)

(58) Field of Classification Search
CPC ......... F16J 15/43; F16C 33/765; F16C 35/07; F16C 33/78; F16C 33/1035; H02K 5/124
See application file for complete search history.

(56) References Cited

U.S. PATENT DOCUMENTS 4,407,518 A * 10/1983 Moskowitz .............. F16J 15/43
                                                                277/302
4,526,380 A *  7/1985 Raj ......................... F16J 15/43
                                                                277/410
(Continued)

FOREIGN PATENT DOCUMENTS

JP    H06257675 A    9/1994
JP    2003-269623 A    9/2003
(Continued)

OTHER PUBLICATIONS

Chinese Office Action dated Oct. 27, 2017 (corresponding to Chinese Application No. 201580022741.2).
(Continued)

*Primary Examiner* — Eugene G Byrd
(74) *Attorney, Agent, or Firm* — Harness, Dickey & Pierce, P.L.C.

(57) ABSTRACT

In an assembly method of a magnetic fluid seal (100) that includes a magnetic field forming member (130) divided in a circumferential direction, a magnetic pole member (120) including a pair of magnetic fluid retaining portions (121, 122) and a coupling portion (123) that couples them, a first bearing (160) and a second bearing (170), a step of fixing the first bearing (160) to a shaft (400) in a state in which the shaft (400) is directed in a vertical direction, a step of attaching the magnetic pole member (120) from above the first bearing (160), a step of fixing the second bearing (170) to the shaft (400) from above the magnetic pole member (120) to thereby fix the magnetic pole member (120) in a state in which the magnetic pole member (120) is positioned with respect to the shaft (400); and a step of attaching the magnetic field forming member (130) between the pair of magnetic fluid retaining portions (121, 122) are performed in order.

2 Claims, 5 Drawing Sheets

(51) Int. Cl.
*F16C 35/07* (2006.01)
*F16C 33/76* (2006.01)

(56) References Cited

U.S. PATENT DOCUMENTS

| | | | | |
|---|---|---|---|---|
| 4,526,382 | A * | 7/1985 | Raj | F16J 15/43 |
| | | | | 277/410 |
| 4,527,805 | A * | 7/1985 | Gowda | F16J 15/43 |
| | | | | 277/410 |
| 4,575,103 | A * | 3/1986 | Pedu | F16D 37/02 |
| | | | | 277/410 |
| 5,291,509 | A * | 3/1994 | Mizoguchi | F16J 15/43 |
| | | | | 372/37 |
| 5,340,122 | A | 8/1994 | Toboni et al. | |
| 5,826,885 | A * | 10/1998 | Helgeland | F16J 15/162 |
| | | | | 277/302 |
| 5,954,342 | A * | 9/1999 | Mikhalev | F16J 15/43 |
| | | | | 277/347 |
| 6,199,867 | B1 * | 3/2001 | Mahoney | F16J 15/43 |
| | | | | 277/410 |
| 6,857,635 | B1 * | 2/2005 | Li | F16J 15/062 |
| | | | | 277/410 |
| 7,950,672 | B2 * | 5/2011 | Shimazaki | F16J 15/43 |
| | | | | 277/410 |
| 2007/0029737 | A1 * | 2/2007 | Mikhalev | F16J 15/43 |
| | | | | 277/410 |
| 2009/0127794 | A1 * | 5/2009 | Mahoney | F16J 15/43 |
| | | | | 277/410 |
| 2010/0025935 | A1 * | 2/2010 | Helgeland | F16J 15/43 |
| | | | | 277/410 |
| 2010/0230901 | A1 | 9/2010 | Brooks et al. | |
| 2012/0314984 | A1 * | 12/2012 | Honda | F16J 15/43 |
| | | | | 384/462 |
| 2013/0019827 | A1 * | 1/2013 | Oka | F01L 1/352 |
| | | | | 123/90.15 |

FOREIGN PATENT DOCUMENTS

| | | | | |
|---|---|---|---|---|
| JP | 2009-058037 A | | 3/2009 | |
| JP | 2009058037 A | * | 3/2009 | |
| JP | 2010-065736 A | | 3/2010 | |
| JP | 2010065736 A | * | 3/2010 | |
| JP | 2010-255845 A | | 11/2010 | |
| JP | 5024965 B2 | | 9/2012 | |
| JP | WO 2013099385 A1 | * | 7/2013 | F16J 15/43 |
| WO | 2013/099385 A1 | | 7/2013 | |

OTHER PUBLICATIONS

Taiwanese Office Action dated Jul. 26, 2016 with English translation.
Korean Office Action dated Jan. 10, 2018 with English translation (corresponding to KR 10-2016-7029543).

* cited by examiner

ASSEMBLY METHOD OF MAGNETIC FLUID SEAL AND MAGNETIC FLUID SEAL

CROSS-REFERENCE TO RELATED APPLICATIONS

This application is a National Stage of International Application No. PCT/JP2015/063141, filed May 1, 2015 (now WO 2015/174306A1), which claims priority to Japanese Application No. 2014-099713, filed May 13, 2014. The entire disclosures of each of the above applications are incorporated herein by reference.

FIELD

The present disclosure relates to an assembly method of a magnetic fluid seal that seals an annular gap between a shaft and a housing having a shaft hole through which the shaft is inserted, and to a magnetic fluid seal assembled by the method.

BACKGROUND

There has been known a magnetic fluid seal that seals an annular gap between a shaft and a shaft hole of a housing with magnetic fluid retained by a magnetic force (see Patent Literature 1). The magnetic fluid seal disclosed in Patent Literature 1 is provided with an annular permanent magnet having magnetic poles at axial direction both ends, and a pair of magnetic pole members provided on axial direction both sides across the permanent magnet and retaining the magnetic fluid between the magnetic pole members and the shaft. With such a configuration, a magnetic circuit is formed to pass through the permanent magnet, the pair of magnetic pole members, and the shaft made of a magnetic body. Therefore, the magnetic fluid is stably retained between the shaft and the magnetic pole members.

A function and a conventional assembly method of the magnetic fluid seal having the configuration explained above are explained with reference to FIG. 5. FIG. 5 is a schematic partial view showing a state after components of a magnetic fluid seal according to a conventional example are attached to a shaft. Only components necessary for explanation are illustrated. Note that an upward direction in FIG. 5 is a vertical upward side. A magnetic fluid seal 900 according to the conventional example includes a first magnetic pole member 902 and a second magnetic pole member 903, both of which are annular, on axial direction both sides of an annular permanent magnet 901 (hereinafter simply referred to as "magnet 901") divided in the circumferential direction and further includes a first bearing 904 and a second bearing 905 on both sides of both the magnetic pole members 902 and 903. A plurality of annular protrusions 402 are provided in the annular groove 401 provided on the outer circumferential surface of a shaft 400. Note that the plurality of annular protrusions 402 are provided to be divided into a first annular protrusion group 411 and a second annular protrusion group 412. In the magnetic fluid seal 900 configured in this way, magnetic fluid (not shown in the figure) is retained in annular gaps between the outer circumferential surfaces of the annular protrusions 402 and the inner circumferential surfaces of both the magnetic pole members 902 and 903 by a magnetic force acting from a magnetic circuit formed by the magnet 901.

In a conventional assembly method of the magnetic fluid seal 900, first, the first bearing 904 is fixed in a predetermined position of the shaft 400 that is in a state in which the shaft 400 is directed in the vertical direction. Subsequently, after the magnetic fluid (not shown in the figure) is applied to the vicinity of the first annular protrusion group 411, the first magnetic pole member 902 is placed on the first bearing 904. Subsequently, an annular jig (not shown in the figure) having a shape same as the shape of the magnet 901 and divided in the circumferential direction is placed on the first magnetic pole member 902. Subsequently, after the magnetic fluid is applied to the vicinity of the second annular protrusion group 412, the second magnetic pole member 903 is placed on the annular jig. Both the magnetic pole members 902 and 903 are in a state in which the magnetic pole members 902 and 903 are positioned with respect to the shaft 400. However, the magnetic pole members 902 and 903 are only stacked on the other components and are not particularly fixed. Divided pieces of the divided jig are replaced with divided pieces of the divided magnet 901 one by one, whereby attachment of the magnet 901 is performed in a state in which the second magnetic pole member 903 is placed on the jig. When the attachment of the magnet 901 is done, the second bearing 905 is attached from the upward direction and fixed in a position where the second bearing 905 is in contact with the second magnetic pole member 903. Consequently, both the magnetic pole members 902 and 903 and the magnet 901 are fixed in the state in which the magnetic pole members 902 and 903 and the magnet 901 are positioned with respect to the shaft 400.

As explained above, in the conventional assembly method of the magnetic fluid seal 900, the magnet 901 is attached before both the magnetic pole members 902 and 903 are fixed by the second bearing 905. Therefore, in the conventional assembly method, in a period from after attachment of the divided pieces of the magnet 901 until before attachment of the second bearing 905, the first magnetic pole member 902 and the second magnetic pole member 903 are sometimes attracted to the shaft 400 by the magnetic circuit formed by the magnet 901. When the magnetic pole members move in this way, there is a concern about deterioration in sealing function of the magnetic fluid seal 900. When a movement amount is large, it is likely that the moved magnetic pole members come into contact with the shaft 400. Therefore, the movement of the magnetic pole members is undesirable.

It is conceivable to adopt a method of fixing both the magnetic pole members 902 and 903 by attaching the second bearing 905 before replacing the divided pieces of the jig with the divided pieces of the magnet 901. However, when the second bearing 905 is fixed first, it is difficult to take out the divided pieces of the jig radially outward because the divided pieces are pressed by both the magnetic pole members 902 and 903. When the divided pieces of the jig are taken out, the gap between both the magnetic pole members 902 and 903 is narrowed. Therefore, attachment of the divided pieces of the magnet 901 could be difficult. Therefore, the method of fixing the second bearing 905 first is unrealistic.

As explained above, when the magnetic fluid seal provided with the magnetic pole members (holding portions for the magnetic fluid) on both the sides of the magnet is assembled by the conventional method, the magnetic pole members sometimes move from the positions where the magnetic pole members are positioned due to a magnetic force from the attached magnet.

CITATION LIST

Patent Literature

Patent Literature 1: Japanese Patent Application Laid-Open No. 2010-255845

SUMMARY

Technical Problem

It is an object of the present disclosure to provide an assembly method that can suppress, when assembling a magnetic fluid seal provided with retaining portions for magnetic fluid on both sides of a magnetic field forming member, magnetic pole members from moving with a magnetic force from the attached magnetic field forming member.

Solution to Problem

The present disclosure adopts a configuration explained below in order to solve the problem.

That is, an assembly method of a magnetic fluid seal according to the present disclosure is an assembly method of a magnetic fluid seal that seals an annular gap between a shaft and a housing having a shaft hole through which the shaft is inserted, the magnetic fluid seal including: an annular magnetic field forming member having magnetic poles at both ends in an axial direction and divided in a circumferential direction; an annular magnetic pole member including a pair of magnetic fluid retaining portions that retains magnetic fluid with a magnetic force between the magnetic fluid retaining portions and the shaft, the magnetic fluid retaining portions being disposed to be spaced apart in the axial direction, and a coupling portion that couples the pair of magnetic fluid retaining portions; and a first bearing and a second bearing provided on both sides in the axial direction of the magnetic pole member, the assembly method including: a first bearing fixing step of fixing the first bearing to the shaft in a state in which the shaft is directed in a vertical direction; a magnetic pole member attaching step of attaching the magnetic pole member from above the first bearing after the first bearing fixing step; a second bearing fixing step of fixing the second bearing to the shaft from above the magnetic pole member after the magnetic pole member attaching step to thereby fix the magnetic pole member in a state in which the magnetic pole member is positioned with respect to the shaft; and a magnetic field forming member attaching step of attaching the magnetic field forming member between the pair of magnetic fluid retaining portions in the magnetic pole member after the second bearing fixing step.

With the assembly method of the magnetic fluid seal according to the present disclosure, the magnetic pole member is fixed by the second bearing in the state in which the magnetic pole member is positioned with respect to the shaft. Thereafter, the magnetic field forming member is attached between the pair of magnetic fluid retaining portions separated by the coupling portion. Consequently, it is possible to attach the magnetic field forming member even after the magnetic pole member is fixed by the second bearing. Further, since the magnetic field forming member is attached, movement of the magnetic pole member due to the magnetic force is suppressed even if a magnetic circuit is formed to pass through the magnetic field forming member, the magnetic pole member, and the shaft. Note that the shaft for which the magnetic fluid seal according to the present disclosure is used is assumed to be a shaft made of a magnetic body or a shaft obtained by attaching a sleeve having a cylindrical shape made of a magnetic body to a radially outer side of a shaft made of a nonmagnetic body, and the like that is configured from a magnetic body at least at a position on the outer circumferential surface of the shaft where the magnetic fluid is retained.

In the assembly method, the magnetic fluid seal may further include: a first spacer provided with an engaging portion that engages in a radial direction with a first end portion in the axial direction in the magnetic pole member to thereby position the magnetic pole member in the radial direction; and a second spacer provided with an engaging portion that engages in the radial direction with a second end portion in the axial direction in the magnetic pole member to thereby position the magnetic pole member in the radial direction, and the assembly method may further include: a first spacer attaching step of attaching the first spacer from above the first bearing after the first bearing fixing step and before the magnetic pole member attaching step; and a second spacer attaching step of attaching the second spacer from above the magnetic pole member after the magnetic pole member attaching step and before the second bearing fixing step.

With this assembly method, due to engagement in the radial direction between the engaging portions of both of the attached spacers and the axial direction both end portions in the magnetic pole member, the magnetic pole member is fixed in the positioned state.

Note that, in the magnetic fluid seal assembled by the assembly method, the first spacer may be provided with a further engaging portion that engages with an outer circumferential surface of the first bearing in the radial direction, whereby the first spacer is positioned in the radial direction, and the second spacer may be provided with a further engaging portion that engages with an outer circumferential surface of the second bearing in the radial direction, whereby the second spacer is positioned in the radial direction.

With the magnetic fluid seal, the first spacer is fixed in a positioned state by engaging with the first bearing in the radial direction and the second spacer is fixed in a positioned state by engaging with the second bearing in the radial direction. Consequently, the magnetic pole member is fixed in a state in which the magnetic pole member is positioned with respect to both the bearings via both the spacers.

Note that, in the magnetic fluid seal which is assembled by the assembly method and which does not include the spacers, the first end portion in the axial direction in the magnetic pole member may be provided with an engaging portion that engages with the outer circumferential surface of the first bearing in the radial direction, whereby the magnetic pole member is positioned in the radial direction, and the second end portion in the axial direction in the magnetic pole member may be provided with an engaging portion that engages with the outer circumferential surface of the second bearing in the radial direction, whereby the magnetic pole member is positioned in the radial direction.

With the magnetic fluid seal, due to engagement in the radial direction between the axial direction both end portions in the magnetic pole member and the outer circumferential surfaces of both the bearings, the magnetic pole member is fixed in a state in which the magnetic pole member is positioned with respect to both the bearings.

Advantageous Effects of the Disclosure

According to the present disclosure, when the magnetic fluid seal provided with the retaining portions for the magnetic fluid on both the sides of the magnetic field forming member is assembled, it is possible to suppress movement of the magnetic pole member due to a magnetic force from the attached magnetic field forming member.

DRAWINGS

DETAILED DESCRIPTION

Hereinafter, modes for carrying out the present disclosure will be exemplarily described in detail based on examples thereof with reference to the drawings. However, the dimensions, materials, shapes, relative arrangements and so on of constituent parts described in the examples are not intended to limit the scope of the present disclosure to these alone in particular unless specifically described. Note that a magnetic fluid seal assembled by an assembly method according to the present disclosure is used to, for example, seal a vacuum container such as a semiconductor manufacturing apparatus. More specifically, the magnetic fluid seal is applied to an introducing portion of a rotating shaft that transmits rotating power from the outside to the inside of the vacuum container.

Example 1

Overall Configuration of a Magnetic Fluid Seal

Figure 1:
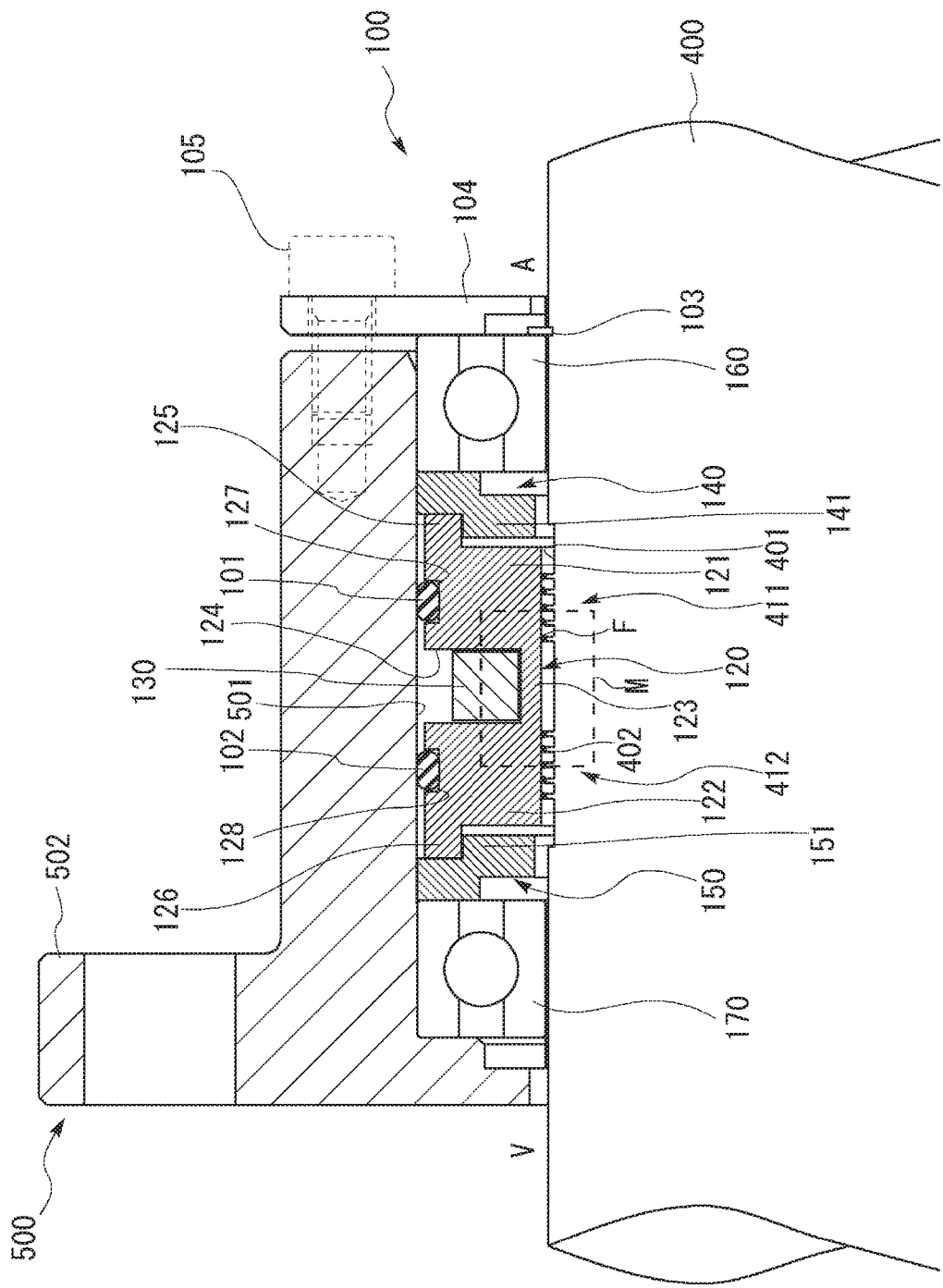
FIG. 1 is a schematic partial view of a magnetic fluid seal according to an Example 1 of the present disclosure.

The overall configuration of a magnetic fluid seal 100 according to an Example of the present disclosure is explained with reference to FIG. 1. FIG. 1 is a schematic partial view taken along a plane including the center axis of a shaft 400 showing the schematic configuration of the magnetic fluid seal 100. Note that the configuration of a portion on the opposite side across the center axis is generally symmetrical to the configuration shown in the figure. Therefore, illustration of the portion is omitted.

The magnetic fluid seal 100 is used to seal an annular gap between the shaft 400 made of a magnetic body and a housing 500 having a shaft hole 501 through which the shaft 400 is inserted. An annular groove 401 is provided on the outer circumferential surface of the shaft 400. A plurality of annular protrusions 402 are provided in the annular groove 401. Note that, in this Example, the plurality of annular protrusions 402 are provided to be divided into a first annular protrusion group 411 provided on an atmosphere side A (the right side in the figure) and a second annular protrusion group 412 provided on a vacuum side V (the left side in the figure). The housing 500 made of a nonmagnetic body includes, on the vacuum side V, an outward flange portion 502 fixed to the outer wall surface of a vacuum container or the like. In this Example, the housing 500 made of the nonmagnetic body is attached to the outer side of the magnetic fluid seal 100. Therefore, a magnetic field leak of a magnet 130 is effectively suppressed. Note that, as an alternative of the shaft 400 made of the magnetic body, a shaft obtained by attaching a sleeve having a cylindrical shape made of a magnetic body to the radially outer side of a shaft made of a nonmagnetic body may be used. That is, when taking the shaft 400 as an example, the magnetic fluid seal 100 according to this Example can be applied to the shaft 400 as long as the shaft 400 is a shaft in which at least the plurality of annular protrusions 402 and the vicinities of the annular protrusions 402 on the outer circumferential surface are configured from a magnetic body.

Figure 2:
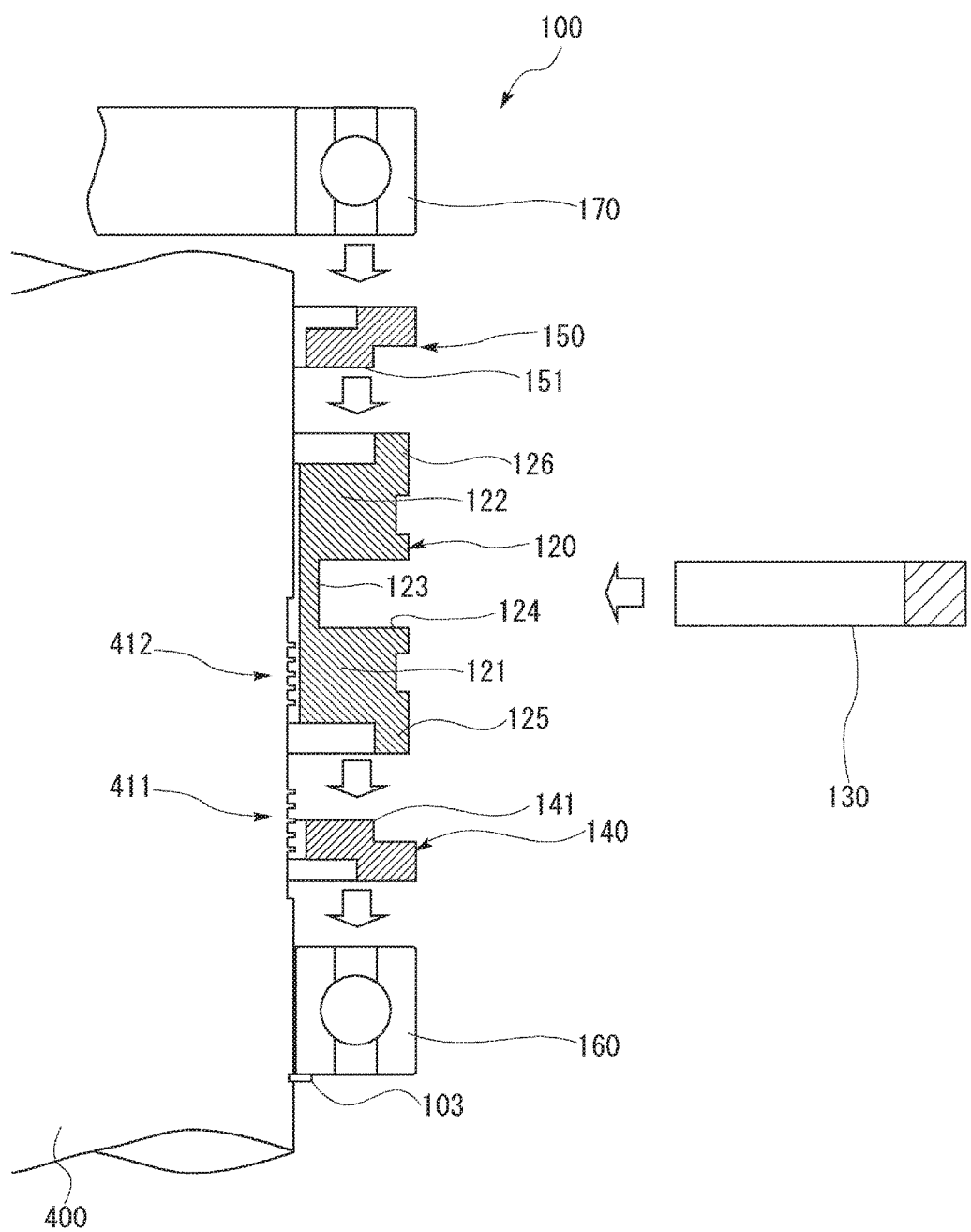
FIG. 2 is a diagram for explaining an assembly method of the magnetic fluid seal according to the Example 1 of the present disclosure.

The magnetic fluid seal 100 includes the permanent magnet 130 (hereinafter simply referred to as "magnet 130") functioning as an annular magnetic field forming member including magnetic poles at both ends in the axial direction. The magnet 130 is divided in the circumferential direction and is formed in an annular shape as a whole when divided portions are combined. Note that, as shown in FIG. 2 referred to below, in this Example, the magnet 130 is equally divided into two in the circumferential direction. The magnetic fluid seal 100 includes a magnetic pole member 120 made of a magnetic body. In the magnetic pole member 120, a first magnetic fluid retaining portion 121 and a second magnetic fluid retaining portion 122, which retain magnetic fluid F with a magnetic force between the magnetic pole member 120 and the shaft 400, are provided to be spaced apart from each other in the axial direction. Further, in the magnetic pole member 120, a coupling portion 123 having a cylindrical shape, which couples the pair of magnetic fluid retaining portions 121 and 122, is provided on the radial direction inner side. That is, in this Example, the pair of magnetic fluid retaining portions 121 and 122 is integrally configured as a single component by being coupled by the coupling portion 123. An annular groove 124, to which the magnet 130 is attached, is provided on the outer circumference side of the coupling portion 123. Note that a pair of annular grooves 127 and 128 is further provided across the annular groove 124 on the outer circumference of the magnetic pole member 120. Seal rings 101 and 102 are respectively attached to the pair of annular grooves 127 and 128. A space between the shaft hole 501 and the magnetic pole member 120 is sealed by the seal rings 101 and 102.

An annular first spacer 140 is set on the atmosphere side A of the magnetic pole member 120. The outer circumferential surface of the first spacer 140 is in contact with the inner circumferential surface of the shaft hole 501. An engaging portion 141 having a cylindrical shape projecting in the axial direction is provided on the radial direction inner side of the end portion of the first spacer 140 on the vacuum side V. The engaging portion 141 engages with a cylinder portion 125 having a cylindrical shape provided on the radially outer side of the end portion on the atmosphere side A in the magnetic pole member 120 and projecting in the axial direction. Specifically, the outer circumferential surface of the engaging portion 141 and the inner circumferential surface of the cylinder portion 125 engage with each other in the radial direction. Similarly, an annular second spacer 150, the outer circumferential surface of which is in contact with the inner circumferential surface of the shaft hole, is set on the vacuum side V of the magnetic pole member 120. An engaging portion 151 having a cylindrical shape projecting in the axial direction is provided on the radial direction inner side of the end portion on the atmosphere side A in the second spacer 150. The outer circumferential surface of the engaging portion 151 engages with, in the radial direction, the inner circumferential surface of a cylinder portion 126 having a cylindrical shape provided on the radially outer side of the end portion on the vacuum side V in the magnetic pole member 120 and projecting in the axial direction. As explained above, the engaging portions provided in the spacers engage with, in the radial direction, the cylinder portions provided at the end portions of the magnetic pole member 120, whereby the magnetic pole member 120 is positioned in the radial direction.

A first bearing 160 and a second bearing 170 for rotatably axially supporting the shaft 400 are set on both sides in the axial direction across both the spacers 140 and 150. The first bearing 160 is fixed in a state in which the first bearing 160 is positioned with respect to the shaft 400 by a stop ring 103. As explained in detail below, in the magnetic fluid seal 100, components set between both the bearings 160 and 170 are fixed in a state in which the components are positioned with respect to the shaft 400 by being sandwiched from both sides by both the bearings 160 and 170. Fixing of the magnetic fluid seal 100 and the housing 500 is performed by a stopper 104 fastened to the housing 500 by a bolt 105. Note that an actual fastening position of the bolt 105 is not a position shown in FIG. 1. Therefore, the bolt 105 is drawn by a dotted line.

In the magnetic fluid seal 100 configured as explained above, a magnetic circuit M is formed by the magnet 130 attached to the annular groove 124 to pass through the magnet 130, both the magnetic fluid retaining portions 121 and 122, and both the annular protrusion groups 411 and 412. Annular gaps between the outer circumferential surfaces of the annular protrusions 402 of both the annular protrusion groups 411 and 412 and the inner circumferential surfaces of both the magnetic fluid retaining portions 121 and 122 have high magnetic flux density because intervals of the annular gaps are locally reduced. Therefore, in the magnetic fluid seal 100, the magnetic fluid F is stably retained in the annular gaps having the high magnetic flux density. Since the magnetic fluid F is retained in a plurality of annular gaps in this way, the magnetic fluid seal that can withstand a relatively large differential pressure is configured.

<Assembly Method of the Magnetic Fluid Seal>

An assembly method of the magnetic fluid seal according to this Example is explained with reference to FIG. 2. FIG. 2 is a diagram showing an assembly procedure of the magnetic fluid seal 100. Note that, in FIG. 2, as in FIG. 1, a configuration on the opposite side across the center axis of the shaft 400 is omitted. Arrows in the figure schematically indicate attaching directions of components.

In an assembly method of the magnetic fluid seal 100, first, in a first bearing fixing step, the first bearing 160 is fixed in a predetermined position of the shaft 400 directed in the vertical direction. Note that the first bearing 160 is positioned with respect to the shaft 400 by the stop ring 103 and fixed by fitting the inner circumferential surface of the first bearing 160 and the outer circumferential surface of the shaft 400 with each other.

Subsequently, in a first spacer attaching step, the first spacer 140 is attached from above the first bearing 160. Note that the first spacer 140 is positioned in the radial direction after being placed on the first bearing 160. This positioning is performed by, for example, adjusting the position of the outer circumferential surface of the first spacer 140 to the position of the outer circumferential surface of the first bearing 160. Note that, in this state, the first spacer 140 is not fixed to the first bearing 160. However, since the end faces of the first spacer 140 and the first bearing 160 are in surface contact with each other, the first spacer 140 does not move unless a certain degree of external force acts on the first spacer 140.

Subsequently, after magnetic fluid (not shown in the figure) is applied to the vicinities of both the annular protrusion groups 411 and 412 provided in the shaft 400, in a magnetic pole member attaching step, the magnetic pole member 120 is attached from above the first spacer 140. Consequently, the inner circumferential surface of the cylinder portion 125 of the magnetic pole member 120 and the outer circumferential surface of the engaging portion 141 provided in the first spacer 140 engage with each other in the radial direction. Therefore, the magnetic pole member 120 is positioned in the radial direction.

Subsequently, in a second spacer attaching step, the second spacer 150 is attached from above the magnetic pole member 120. Consequently, the outer circumferential surface of the engaging portion 151 provided in the second spacer 150 and the inner circumferential surface of the cylinder portion 126 of the magnetic pole member 120 engage with each other in the radial direction. Therefore, the magnetic pole member 120 and the second spacer 150 are positioned with respect to each other in the radial direction.

Subsequently, in a second bearing fixing step, the second bearing 170 is fixed to the shaft 400 from above the second spacer 150. The fixing of the second bearing 170 is performed to sandwich the magnetic pole member 120 and both the spacers 140 and 150 between the second bearing 170 and the first bearing 160. Consequently, the magnetic pole member 120 and both the spacers 140 and 150 are fixed in a state in which the magnetic pole member 120 and both the spacers 140 and 150 are positioned with respect to the shaft 400 in the radial direction and the axial direction. Note that the second bearing 170 is fixed by fitting the inner circumferential surface of the second bearing 170 and the outer circumferential surface of the shaft 400 with each other.

Subsequently, in a magnetic field forming member attaching step, the magnet 130 is attached between the pair of magnetic fluid retaining portions 121 and 122 in the magnetic pole member 120. In this Example, divided pieces of the magnet 130 equally divided into two are attached in the annular groove 124 of the magnetic pole member 120 from the outer side. Note that the magnet 130 is fixed by fitting the both end faces in the axial direction of the magnet 130 and the both side surfaces in the axial direction of the annular groove 124 with each other. When the magnet 130 is attached to the annular groove 124, the magnetic circuit M is formed by the magnet 130. Therefore, the applied magnetic fluid is retained to be collected in the plurality of annular gaps between the outer circumferential surfaces of the annular protrusions 402 and the inner circumferential surfaces of both the magnetic fluid retaining portions 121 and 122.

<Excellent Points of the Assembly Method of the Magnetic Fluid Seal According to this Example>

In the magnetic pole member 120, the pair of magnetic fluid retaining portions 121 and 122 is integrally provided in a state in which the pair of magnetic fluid retaining portions 121 and 122 is separated by the coupling portion 123 provided on the radial direction inner side. The annular groove 124, to which the magnet 130 is attached, is provided on the outer circumference side of the coupling portion 123. Therefore, as in the case in which the magnetic pole member 120 is fixed by the second bearing 170, even in a state in which force for pressing in the axial direction acts, it is possible to attach the magnet 130 between both the magnetic fluid retaining portions 121 and 122 from the radially outer side. With the assembly method, after the magnetic pole member 120 is fixed in a state in which the magnetic pole member 120 is positioned with respect to the shaft 400, the magnet 130 is attached. Therefore, even if the magnetic circuit M is formed by the attached magnet 130, movement of the magnetic pole member 120 by a magnetic force acting from the magnetic circuit is suppressed. Consequently, with the assembly method according to this Example, during assembly of the magnetic fluid seal in which the retaining portions for the magnetic fluid are provided on both sides of the magnetic field forming member, it is possible to suppress the magnetic pole member from moving with a magnetic force from the attached magnetic field forming member. As a result, compared with the conventional assembly method, it is possible to more accurately manage dimensions of the annular gaps in which the magnetic fluid is retained.

Example 2

In the Example 1, the configuration is explained in which the end faces in the axial direction of the spacers and the end faces in the axial direction of the bearings are in surface contact with each other. On the other hand, in an Example 2, a configuration is explained in which further engaging portions, which engage with the outer circumferential surfaces of the bearings, are provided in the spacers. The Example 2 is explained below with reference to FIG. 3. Note that components same as the components in the Example 1 are denoted by the same reference numerals and signs and explanation of the components is omitted. Action of the same components is substantially the same.

Figure 3:
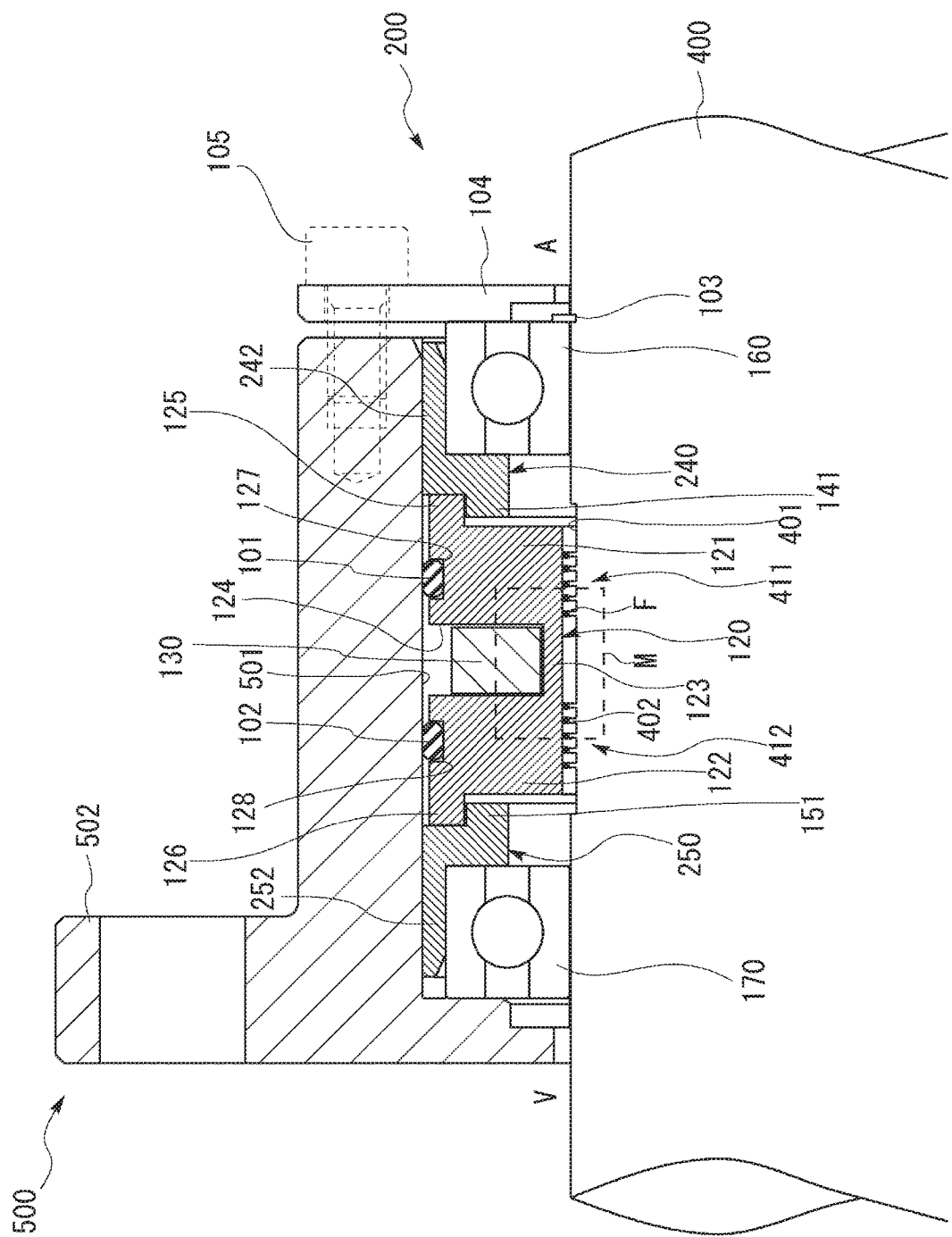
FIG. 3 is a schematic partial view of a magnetic fluid seal according to an Example 2 of the present disclosure.

FIG. 3 is a schematic partial view same as FIG. 1 showing the schematic configuration of a magnetic fluid seal 200 according to the Example 2. An annular first spacer 240 provided on the atmosphere side A of the magnetic pole member 120 includes, at the end portion on the vacuum side V, the engaging portion 141 that engages with the cylinder portion 125 of the magnetic pole member 120 and includes, on the radially outer side at the end portion on the atmosphere side A, an engaging portion 242 having a cylindrical shape projecting in the radial direction. The inner circumferential surface of the engaging portion 242 engages with the outer circumferential surface of the first bearing 160 in the radial direction. Consequently, the first spacer 240 is fixed in a state in which the first spacer 240 is positioned with respect to the first bearing 160 in the radial direction. Similarly, an annular second spacer 250 provided on the vacuum side V of the magnetic pole member 120 includes, at the end portion on the atmosphere side A, the engaging portion 151 that engages with the cylinder portion 126 of the magnetic pole member 120 and includes, on the radially outer side at the end portion of the vacuum side V, an engaging portion 252 having a cylindrical shape projecting in the axial direction. The inner circumferential surface of the engaging portion 252 engages with the outer circumferential surface of the second bearing 170 in the radial direction. Consequently, the second spacer 250 is fixed in a state in which the second spacer 250 is positioned with respect to the second bearing 170 in the radial direction.

The assembly method of the magnetic fluid seal 200 is the same as the assembly method of the magnetic fluid seal 100. In a first spacer attaching step, when the first spacer 240 is attached from above the first bearing 160, the engaging portion 242 engages with the first bearing 160 in the radial direction, whereby positioning of the first spacer 240 is naturally performed. In a second bearing fixing step, when the second bearing 170 is fixed from above the second spacer 250, the engaging portion 252 engages with the second bearing 170 in the radial direction, whereby positioning of the second spacer 250 is naturally performed.

In the magnetic fluid seal 200 configured as explained above and the assembly method of the magnetic fluid seal 200, it is possible to obtain effects same as the effects of the magnetic fluid seal 100. In addition to this, with the magnetic fluid seal 200, as explained above, positioning of both the spacers 240 and 250 is naturally performed during the assembly. With the magnetic fluid seal 200, the magnetic pole member 120 is positioned in the radial direction with respect to both the bearings 160 and 170 via both the spacers 240 and 250.

Example 3

In the Example 1, the configuration is explained in which the cylinder portions provided at both the end portions of the magnetic pole member engage with the engaging portions of the spacers in the radial direction. On the other hand, in the Example 3, a configuration is explained in which the spacers are not used and the cylinder portions of the magnetic pole member engage with the outer circumferential surfaces of the bearings. The Example 3 is explained below with reference to FIG. 4. Note that components same as the components in the Example 1 are denoted by the same reference numerals and signs and explanation of the components is omitted. Action of the same components is substantially the same.

Figure 4:
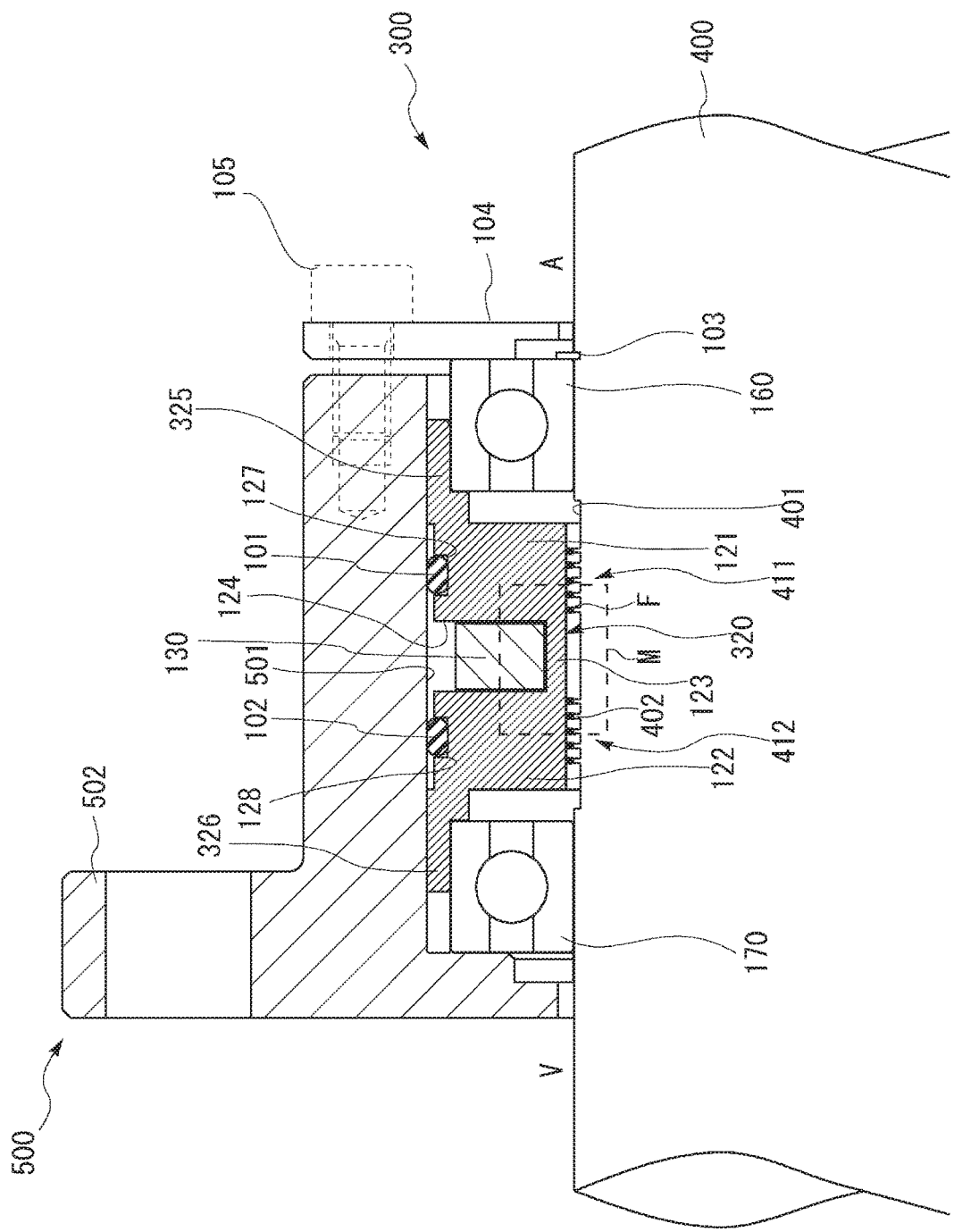
FIG. 4 is a schematic partial view of a magnetic fluid seal according to an Example 3 of the present disclosure.
Figure 5:
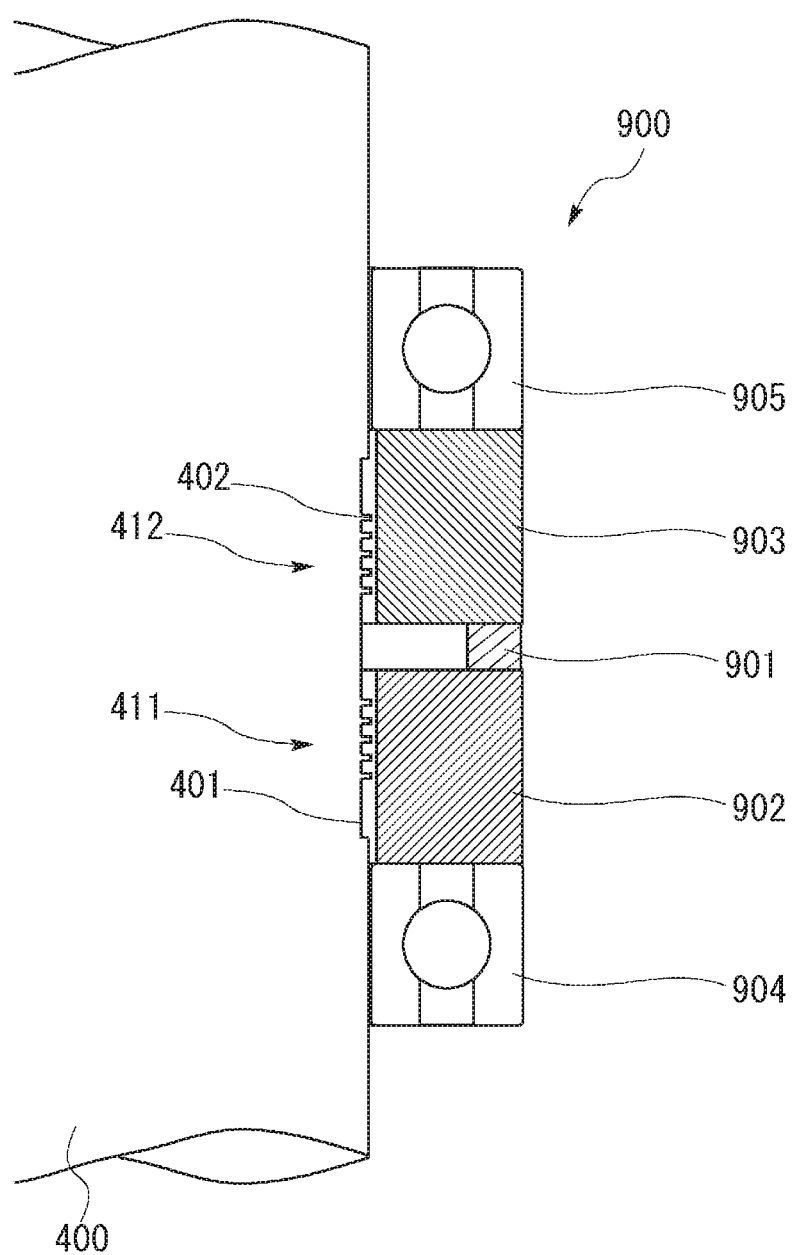
FIG. 5 is a diagram for explaining an assembly method of a magnetic fluid seal according to a conventional example.

FIG. 4 is a schematic partial view same as FIG. 1 showing the schematic configuration of a magnetic fluid seal 300 according to the Example 3. Like the magnetic pole member 120 in the Example 1, a magnetic pole member 320 made of a magnetic body includes the pair of magnetic fluid retaining portions 121 and 122 and the coupling portion 123. A cylinder portion 325 having a cylindrical shape projecting in the axial direction is provided on the radially outer side at the end portion on the atmosphere side A of the magnetic pole member 320. The inner circumferential surface of the cylinder portion 325 engages with the outer circumferential surface of the first bearing 160 in the radial direction. Similarly, a cylinder portion 326 having a cylindrical shape projecting in the axial direction is provided on the radially outer side at the end portion on the vacuum side V of the magnetic pole member 320. The inner circumferential surface of the cylinder portion 326 engages with the outer circumferential surface of the second bearing 170 in the radial direction. Consequently, the magnetic pole member 320 is fixed in a state in which the magnetic pole member 320 is positioned with respect to both the bearings 160 and 170 in the radial direction.

In the assembly method of the magnetic fluid seal 300, steps excluding the first spacer attaching step and the second spacer attaching step in the assembly method of the magnetic fluid seal 100 are performed in the same manner. Note that, in a magnetic pole member attaching step, the magnetic pole member 320 is attached from above the first bearing 160. Consequently, the inner circumferential surface of the cylinder portion 325 of the magnetic pole member 320 engages with the outer circumferential surface of the first bearing 160 in the radial direction. Therefore, the magnetic pole member 320 is positioned in the radial direction. In a second bearing fixing step, the second bearing 170 is attached from above the magnetic pole member 320. Fixing of the second bearing 170 is performed to sandwich the magnetic pole member 320 between the second bearing 170 and the first bearing 160. The inner circumferential surface of the cylinder portion 326 of the magnetic pole member 320 engages with the outer circumferential surface of the second bearing 170 in the radial direction. Therefore, the magnetic pole member 320 is positioned in the radial direction on the vacuum side V as well. Consequently, the magnetic pole member 320 is fixed in a state in which the magnetic pole member 320 is positioned with respect to the shaft 400 in the radial direction and the axial direction.

In the magnetic fluid seal 300 configured as explained above and the assembly method of the magnetic fluid seal 300, it is possible to obtain effects same as the effects in the magnetic fluid seal 100. In addition to this, in the assembly method of the magnetic fluid seal 300, the steps of attaching the spacers are unnecessary. Therefore, the assembly method is simpler compared with the assembly method of the magnetic fluid seal 100.

Other Examples

In the Examples, the magnetic pole member is configured from a single component. However, the pair of magnetic fluid retaining portions and the coupling portion may be configured from different components as long as the pair of magnetic fluid retaining portions is integrally configured by being coupled by the coupling portion. For example, a pair of magnetic fluid retaining portions configured from separate components may be integrally configured by being coupled by a coupling portion made of a nonmagnetic body. In this case, a part of the magnetic circuit formed by the magnet 130 does not pass through the coupling portion. Therefore, it is possible to stabilize the magnetic circuit that passes through the pair of magnetic fluid retaining portions and the shaft 400.

In the Examples, the coupling portion is configured in the cylindrical shape. However, the configuration of the coupling portion is not limited to this. For example, the coupling portion can be configured from a plurality of columns disposed to be spaced a fixed distance from one another in the circumferential direction.

In the Examples, the annular permanent magnet 130 equally divided into two is explained as an example of the magnetic field forming member. However, the configuration of the permanent magnet forming member is not limited to this and may be a permanent magnet divided into a larger number of pieces or may be a divided electromagnet.

In the Examples, the cylinder portions of the magnetic pole member and the engaging portions of both the spacers are configured in the cylindrical shape projecting in the axial direction. However, the shape of the engaging portions is not limited to this. The engaging portions may be configured from other shapes as long as the engagement in the radial direction is possible. For example, the engaging portions may be configured from a plurality of arcuate projecting portions disposed to be spaced a fixed distance from one another in the circumferential direction. Alternatively, the engaging portions may be tubular projecting portions, the cross portion in the radial direction of which is a polygonal shape rather than the cylindrical shape. In the Example 1, for example, the inner circumferential surface of the cylinder portion 125 of the magnetic pole member 120 engages with the outer circumferential surface of the engaging portion 141 of the first spacer 140. However, instead of such a configuration, the outer circumferential surface of the cylinder portion 125 may be configured to engage with the inner circumferential surface of the engaging portion 141. Specifically, by providing the cylinder portion 125 on the radial direction inner side and providing the engaging portion 141 on the radially outer side, it is possible to adopt a configuration in which the outer circumferential surface of the cylinder portion 125 and the inner circumferential surface of the engaging portion 141 engage with each other. Even with such a configuration, it is possible to position the magnetic pole member 120 in the radial direction. Such a configuration can also be adopted in the other cylinder portions in the Examples and the engaging portions that engage with the cylinder portions.

REFERENCE SIGNS LIST

100, 200, 300: magnetic fluid seal
120, 320: magnetic pole member
121: first magnetic fluid retaining portion
122: second magnetic fluid retaining portion
123: coupling portion
130: magnet (magnetic field forming member)
140, 240: first spacer
150, 250: second spacer
160: first bearing
170: second bearing
400: shaft
500: housing
F: magnetic fluid
M: magnetic circuit

The invention claimed is:
1. An assembly method of a magnetic fluid seal that seals an annular gap between a shaft and a housing having a shaft hole through which the shaft is inserted,
   the magnetic fluid seal comprising:
   an annular magnetic field forming member having two ends in an axial direction with magnetic poles at the two ends and the annular magnetic field forming member being divided in a circumferential direction;
   an annular magnetic pole member including a pair of magnetic fluid retaining portions that retains magnetic fluid with a magnetic force between the magnetic fluid retaining portions and the shaft, the magnetic fluid retaining portions being disposed to be spaced apart in the axial direction, and a coupling portion that couples the pair of magnetic fluid retaining portions;
   a first bearing and a second bearing provided on both sides in the axial direction of the magnetic pole member,
   a first spacer provided with an engaging portion that engages in a radial direction with a first end portion in an axial direction in the magnetic pole member to thereby position the magnetic pole member in the radial direction, the first spacer being provided between the magnetic pole member and the first bearing in the axial direction and having contact with the magnetic pole member and the first bearing in the axial direction; and
   a second spacer provided with an engaging portion that engages in the radial direction with a second end portion in the axial direction in the magnetic pole member to thereby position the magnetic pole member in the radial direction, the second spacer being provided between the magnetic pole member and the second bearing in the axial direction and having contact with the magnetic pole member and the second bearing in the axial direction,
   the assembly method comprising:
   a first bearing fixing step of fixing the first bearing to the shaft in a state in which the shaft is directed in a vertical direction and not inserted through the shaft hole;
   a first spacer attaching step of attaching the first spacer from above the first bearing after the first bearing fixing step;

a magnetic pole member attaching step of attaching the magnetic pole member from above the first spacer after the first spacer fixing step;

a second spacer attaching step of attaching the second spacer from above the magnetic pole member after the magnetic pole member attaching step;

a second bearing fixing step of fixing the second bearing to the shaft from above the second spacer after the second spacer attaching step to thereby fix the magnetic pole member in a state in which the magnetic pole member is positioned with respect to the shaft; and a magnetic field forming member attaching step of attaching the magnetic field forming member between the pair of magnetic fluid retaining portions in the magnetic pole member after the second bearing fixing step.

2. The magnetic fluid seal that is assembled by the assembly method of a magnetic fluid seal according to claim 1, wherein the first spacer is provided with a further engaging portion that engages with an outer circumferential surface of the first bearing in the radial direction, whereby the first spacer is positioned in the radial direction, and the second spacer is provided with a further engaging portion that engages with an outer circumferential surface of the second bearing in the radial direction, whereby the second spacer is positioned in the radial direction.

* * * * *